O. T. Nanny,
Horse Rake.
No. 109,439. Patented Nov. 22, 1870.
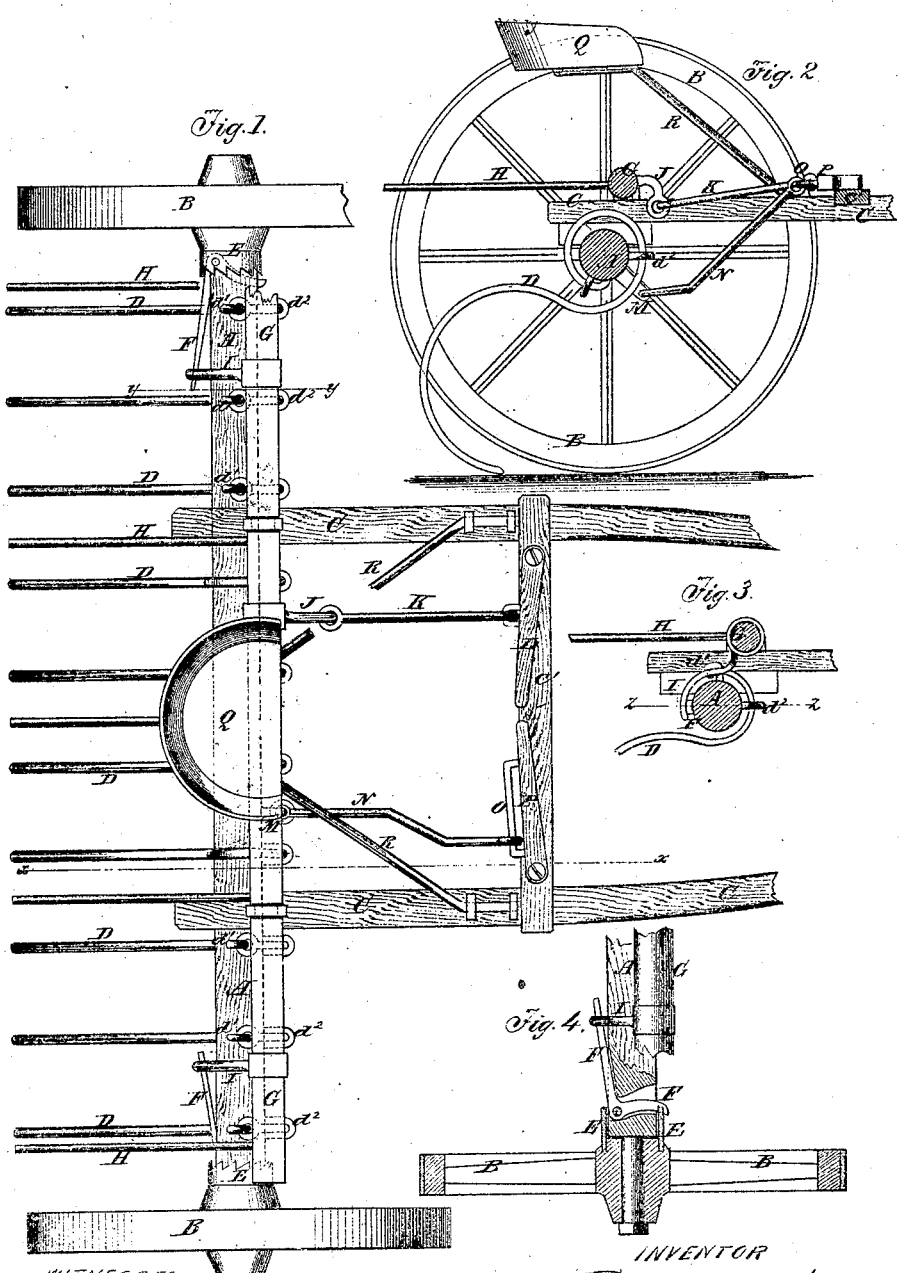

UNITED STATES PATENT OFFICE.

OLIVER T. NANNY, OF AMITY, ASSIGNOR TO HIMSELF AND J. M. HANFORD, OF MIDDLETOWN, NEW YORK.

IMPROVEMENT IN HORSE HAY-RAKES.

Specification forming part of Letters Patent No. 109,439, dated November 22, 1870.

*To all whom it may concern:*

Be it known that I, OLIVER T. NANNY, of Amity, in the county of Orange and State of New York, have invented a new and useful Improvement in Horse Hay-Rake; and I do hereby declare that the following is a full, clear, and exact description thereof, which will enable others skilled in the art to make and use the same, reference being had to the accompanying drawing forming part of this specification.

Figure 1 is a top view of my improved hay-rake. Fig. 2 is a detail vertical section of the same, taken through the line $xx$, Fig. 1. Fig. 3 is a detail section of the same, taken through the line $yy$, Fig. 1. Fig. 4 is a detail horizontal section of the same, taken through the line $zz$, Fig. 3.

Similar letters of reference indicate corresponding parts.

My invention has for its object to furnish an improved horse hay-rake which shall be simple in construction, effective and reliable in operation, and easily operated; and it consists in the construction and combination of the various parts of the rake, as hereinafter more fully described.

A is the axle or shaft of the rake, upon the journals of which the wheels B revolve, and which works in bearings attached to the rear ends of the shafts or thills C. D are the rake-teeth, the lower ends of which are bent into the proper form, as shown in Fig. 2. The upper ends of the teeth D are so formed as to pass half around the axle A, and are secured to the said axle A by eyebolts, staples, or other suitable fastenings $d^1$, which pass through eyes formed upon the said ends of the said teeth. The teeth D pass through long staples or keepers $d^2$, attached to the axle A, as shown in Figs. 1, 2, and 3, which keep the said teeth in place, and at the same time allow them to have the necessary play. Upon the inner ends of the hubs of both wheels B are formed, or to them are attached, ratchet-wheels E, as shown in Figs. 1 and 4, upon the teeth of which the lever-pawls F take hold. The levers F are bent at, or nearly at, right angles, and are pivoted at or near their angles in slots in the end parts of the axles A. The inner or longer arms of the levers F extend along the side of the axle A, which should be slightly grooved to receive them, as shown in Figs. 1 and 4. The outer or shorter arms of the levers F pass through the slots in the axle A, and project from the other side of said axle in such position that when the inner ends of said levers are pressed down against the axle A the said outer ends will be brought into contact with the teeth of the ratchet-wheels E, so that the advance of the machine will raise the teeth D and drop the collected hay. G is a bar extending across the rake above and parallel with the axle A. The bar G works in bearings attached to the rear parts of the shafts C, and to it are attached rearwardly-projecting fingers H, which, as the rake-teeth D are raised, force out the hay and compel it to drop to the ground. To the end parts of the bar G are attached arms I, which project downward, and the lower parts of which are curved, as shown in Figs. 1, 3, and 4, for such a length as to pass about one-quarter around the axle A, as shown in Fig. 3. The arms I are so placed that when the bar G is turned in its bearings the ends of the curved parts of said arms will be pressed down upon the inner ends of the lever-pawls F, causing the advance of the machine to raise the teeth D and discharge the collected hay, as hereinbefore described. As the axle A turns, the ends of the levers F slide along beneath the curved parts of the levers I for such a distance as to pass out from under them. As the ends of the levers F pass out from under the curved parts of the arms I, the said levers will be released, thus releasing the wheels, while at the same time the said curved parts of the arms I will press against the axle A, and thus hold the rake-teeth elevated so long as the pressure is applied. When the pressure is removed the rake-teeth D drop back to a working position by their own weight. To the bar G is attached a downwardly-projecting arm, J, to the lower end of which is pivoted the rear end of the connecting-rod K, the forward end of which is pivoted to the foot-lever L. The outer end of the foot-lever L is pivoted to one of the shafts C, or to the cross-bar $c'$, or other support attached to the said shafts, so that the driver, by operating the lever L with his foot, can depress the levers and raise the rake-teeth to drop the collected hay, and hold them raised for passing from place to place. A catch or pin may be provided for securing the lever L in position to hold the rake-teeth raised when passing from place to place. M is a short downwardly-projecting arm attached to the axle A, to the end of which is pivoted the rear end of the connecting-rod N, the other end of which has an eye formed in it, which receives and slides upon the long keeper or rod O, the ends of which are secured to the foot-lever P. The outer end of the lever P is pivoted to one of the shafts C, or to a cross-bar or other support attached to the said shafts, and its inner end projects into such a position that it may be conveniently reached by the driver and operated with his foot.

By this arrangement the driver, by pressing upon the lever P, may hold the rake-teeth down to the ground with any required force. As the rake-teeth D are raised from the ground the free end of the lever P is drawn to the rearward, and the forward end of the rod N slides upon the rod or keeper O, so that the movements of the other parts of the rake will not be obstructed by the said parts N O P.

In holding down the rake a principal object is to give as great leverage as possible to the foot. This is accomplished by attaching one end of the connecting-rod N to a long tappet, M, on the axle, and the other to a point very near the fulcrum of the foot-lever P. If, however, the end of the rod N was pivoted to this point without being able to slide, it would not allow of a sufficient reverse movement of the shaft to raise the rake into the position required. In order both to give the required leverage to the foot and a sufficient arc of vibration to the axle, I form a slot or elongated staple, O, on which the eye of the rod N slides of itself when the axle is vibrated backward.

The driver's seat Q is supported upon arms or rods R, the lower ends of which are attached to the rear parts of the shafts G.

Having thus described my invention, I claim as new, and desire to secure by Letters Patent—

The combination, with the vibrating rake A D and clearer G H, of clutch E F, arms I, and treadle devices M N O P and J K L, as described, for the purpose specified.

OLIVER T. NANNY.

Witnesses:
   J. M. H. LITTLE,
   L. ARMSTRONG.